US012664287B2

(12) United States Patent　　　　(10) Patent No.:　US 12,664,287 B2

Mora-Golding et al.　　　　　　　　(45) Date of Patent:　Jun. 23, 2026

(54) SYSTEMS AND METHODS FOR DETERMINING VULNERABILITY CRITICALITY

(71) Applicant: DENSO CORPORATION, Kariya (JP)

(72) Inventors: Carlos Mora-Golding, Southfield, MI (US); Ameer Kashani, Southfield, MI (US)

(73) Assignee: DENSO CORPORATION (JP)

( * ) Notice:　Subject to any disclaimer, the term of this patent is extended or adjusted under 35 U.S.C. 154(b) by 107 days.

(21) Appl. No.: 18/403,046

(22) Filed:　Jan. 3, 2024

(65)　　　　　Prior Publication Data

US 2025/0217495 A1　　Jul. 3, 2025

(51) Int. Cl.
*G06F 21/57*　　　　(2013.01)

(52) U.S. Cl.
CPC ...... G06F 21/577 (2013.01); *G06F 2221/033* (2013.01)

(58) Field of Classification Search
CPC .......................... G06F 2221/033; G06F 21/577
See application file for complete search history.

(56)　　　　　References Cited

U.S. PATENT DOCUMENTS

| | | | |
|---|---|---|---|
| 11,206,278 B2 | 12/2021 | Veeramany et al. | |
| 11,483,335 B1 | 10/2022 | Tsokos et al. | |
| 11,522,900 B2 | 12/2022 | Connell et al. | |
| 12,388,858 B1 * | 8/2025 | Lin | G06N 20/10 |
| 2004/0008278 A1 * | 1/2004 | Iggulden | H04N 21/4886 |
| | | | 348/553 |
| 2018/0024889 A1 | 1/2018 | Verma et al. | |
| 2020/0329055 A1 | 10/2020 | Tyagi et al. | |
| 2020/0356675 A1 | 11/2020 | Shakarian et al. | |
| 2021/0021145 A1 | 1/2021 | Uchinohae et al. | |
| 2022/0318395 A1 * | 10/2022 | Janakiraman | G06F 21/577 |
| 2023/0038196 A1 * | 2/2023 | Labreche | G06F 21/577 |
| 2023/0300161 A1 * | 9/2023 | Jenks | H04L 63/1425 |
| 2024/0323205 A1 * | 9/2024 | Kishikawa | H04L 63/1433 |
| 2025/0080564 A1 * | 3/2025 | Barton | H04L 63/1433 |

FOREIGN PATENT DOCUMENTS

| | | | | |
|---|---|---|---|---|
| CN | 108959938 A | * | 12/2018 | G06F 21/577 |

OTHER PUBLICATIONS

Jay Jacobs et al., "Improving vulnerability remediation through better exploit prediction." Journal of Cybersecurity, 2020, pp. 1-12.

* cited by examiner

*Primary Examiner* — Catherine Thiaw
*Assistant Examiner* — Daniel Elahian
(74) *Attorney, Agent, or Firm* — Dickinson Wright PLLC

(57)　　　　　ABSTRACT

Methods and systems for determining vulnerability criticality include creating exploit combinations for known vulnerabilities, inputting new vulnerabilities, determining whether the new vulnerabilities fit into an existing exploit combination or create a new exploit combination, and updating the exploit combinations based on the new vulnerabilities.

16 Claims, 3 Drawing Sheets

SYSTEMS AND METHODS FOR DETERMINING VULNERABILITY CRITICALITY

TECHNICAL FIELD

The present disclosure relates to systems and methods for assessing vulnerabilities, and more specifically, systems and methods for determining vulnerability criticality.

BACKGROUND

In software applications, such as vehicle software, software bugs are generally present during development of the software application. These software bugs may be found and assessed during development, where the bugs may then be addressed and fixed. However, not all software bugs may be addressed during development due to time constraints. Accordingly, the software bugs may be addressed based on an assessed risk, with the higher-risk software bugs being addressed before the lower-risk software bugs. These lower-risk software bugs, or residual risk, may be addressed after launch of the software application.

Continued development of the software application after residual risk is identified may introduce new vulnerabilities in the system that, in combination with the residual risk, may increase the risk associated with the residual risk, thereby increasing the immediacy of addressing the lower-risk software bugs. Accordingly, a need exists for detecting when new vulnerabilities combine with software bugs to increase the risk associated with the software bugs.

SUMMARY

In a first aspect, a method includes: creating exploit combinations for known vulnerabilities; inputting new vulnerabilities; determining whether the new vulnerabilities fit into an existing exploit combination or create a new exploit combination; and updating the exploit combinations based on the new vulnerabilities.

In a second aspect, a computer program product includes a non-transitory computer useable medium including a computer readable code, wherein the computer readable code when executed using one or more computing device processors, causes the one or more computing processors to: create exploit combinations for known vulnerabilities; input new vulnerabilities; determine whether the new vulnerabilities fit into an existing exploit combination or create a new exploit combination; and update the exploit combinations based on the new vulnerabilities.

In a third aspect, a system includes: one or more computing system processors; and memory storing instructions that, when executed by the one or more computing system processors, causes the system to: create exploit combinations for known vulnerabilities; input new vulnerabilities; determine whether the new vulnerabilities fit into an existing exploit combination or create a new exploit combination; and update the exploit combinations based on the new vulnerabilities.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Figure 1:
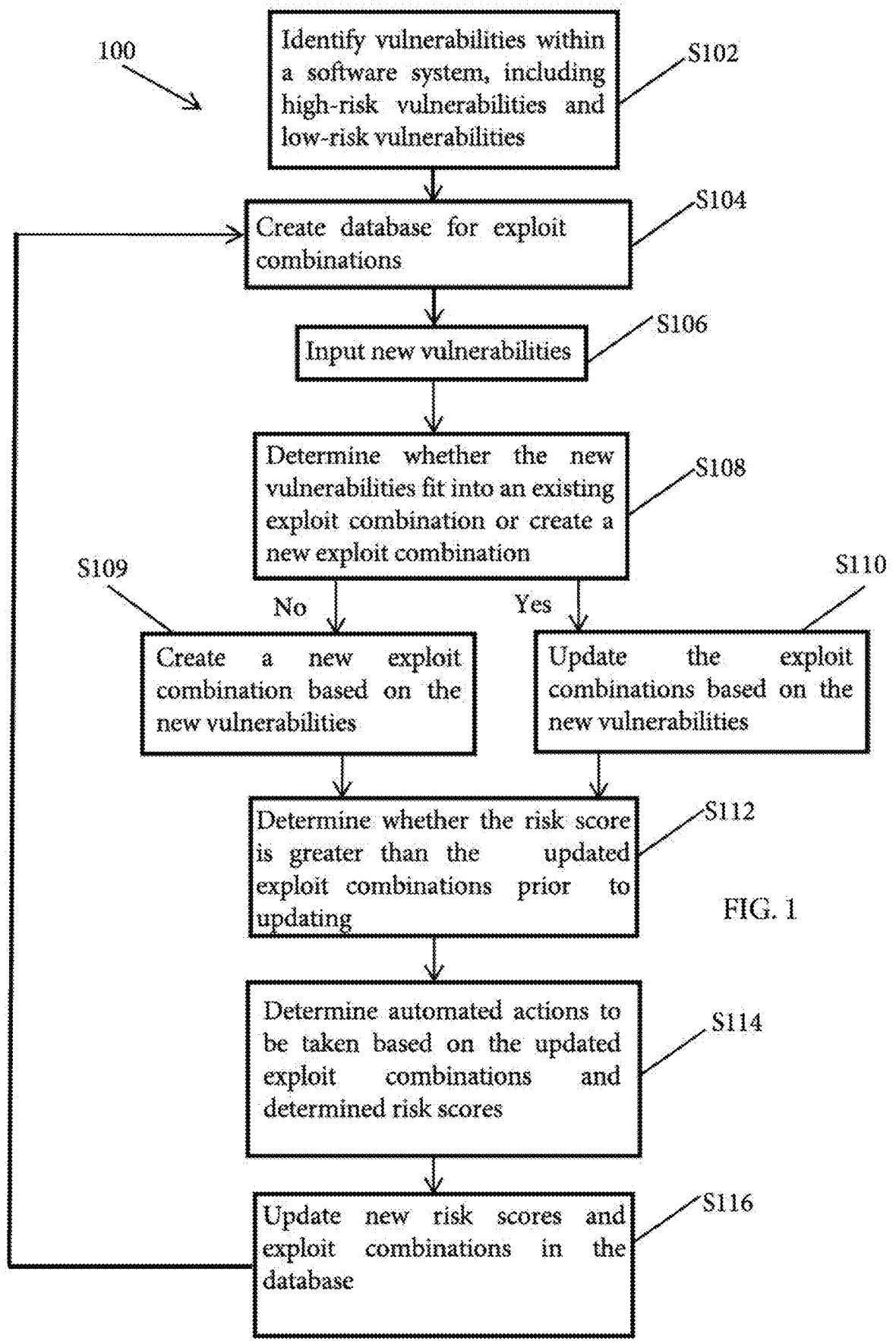
FIG. 1 depicts a flowchart of a method for identifying and assessing new vulnerabilities in a software system, according to one or more embodiments described herein.

Referring initially to FIG. 1, a method for identifying and assessing new vulnerabilities in a software system is depicted. The software system may be configured for use in a vehicle, where the software system controls the function of various vehicle components and systems. The method determines whether the new vulnerabilities fit within an exploit combination to increase the risk associated with the new vulnerabilities and low-risk known vulnerabilities. At step S102, the method may include identifying vulnerabilities within a software system, the vulnerabilities including high-risk vulnerabilities that have a risk score at or above a first predetermined threshold and a second predetermined threshold, medium-risk vulnerabilities that have a risk score at or above a first predetermined threshold, and low-risk vulnerabilities that have a risk score below the first predetermined threshold. As used herein, low-risk vulnerabilities may alternatively be referred to as residual risk. The medium-risk vulnerabilities that have a risk score at or above the second predetermined threshold and below the first predetermined threshold, the second predetermined threshold being less than the first predetermined threshold. The low-risk vulnerabilities may have a risk score that is below both of the first predetermined threshold and the second predetermined threshold. In embodiments, risk scoring of vulnerabilities may be performed using any known standard for vulnerability scoring, such as, for example, the common vulnerability scoring system (CVSS).

As used herein, vulnerabilities may be a flaw in software, firmware, hardware, or service component resulting from a weakness that can be exploited, and resulting in a negative impact to the confidentiality, integrity, or availability of an impacted component or components. As used herein, weaknesses may be a condition in the software, firmware, hardware, or service component that, under certain circumstances, could contribute to the introduction of vulnerabilities. Weaknesses may include, for example, a base weakness, a pillar weakness, a primary weakness, a resultant weakness, a variant weakness, or the like.

The risk score of the vulnerabilities may be associated with a probability or ease of which a weakness can be exploited, where the higher the risk score, the higher the probability or ease of exploitation. The risk score may additionally or alternatively be associated with the severity of impact on one or more systems of the vehicle, where the higher the risk score, the higher the severity of impact on the systems of the vehicle. The severity of impact may be considered higher if the vulnerability affects more than one system of the vehicle, affects a safety-critical component of the vehicle such as brakes, suspension, tires, or vision, or poses personal identifiable information (PII). The systems of the vehicle may include, for example, wireless communication (e.g., WiFi, 3G, 4G, 5G, Bluetooth, etc.), user interfaces (display, speakers and microphones, etc.), user controls (seat controls, window controls, heating and air conditioning controls, etc.), or the like. Compromise of these systems may include, for example, disablement of the systems, control of the systems by an unauthorized user, or the like.

Figures 2A, 2B:
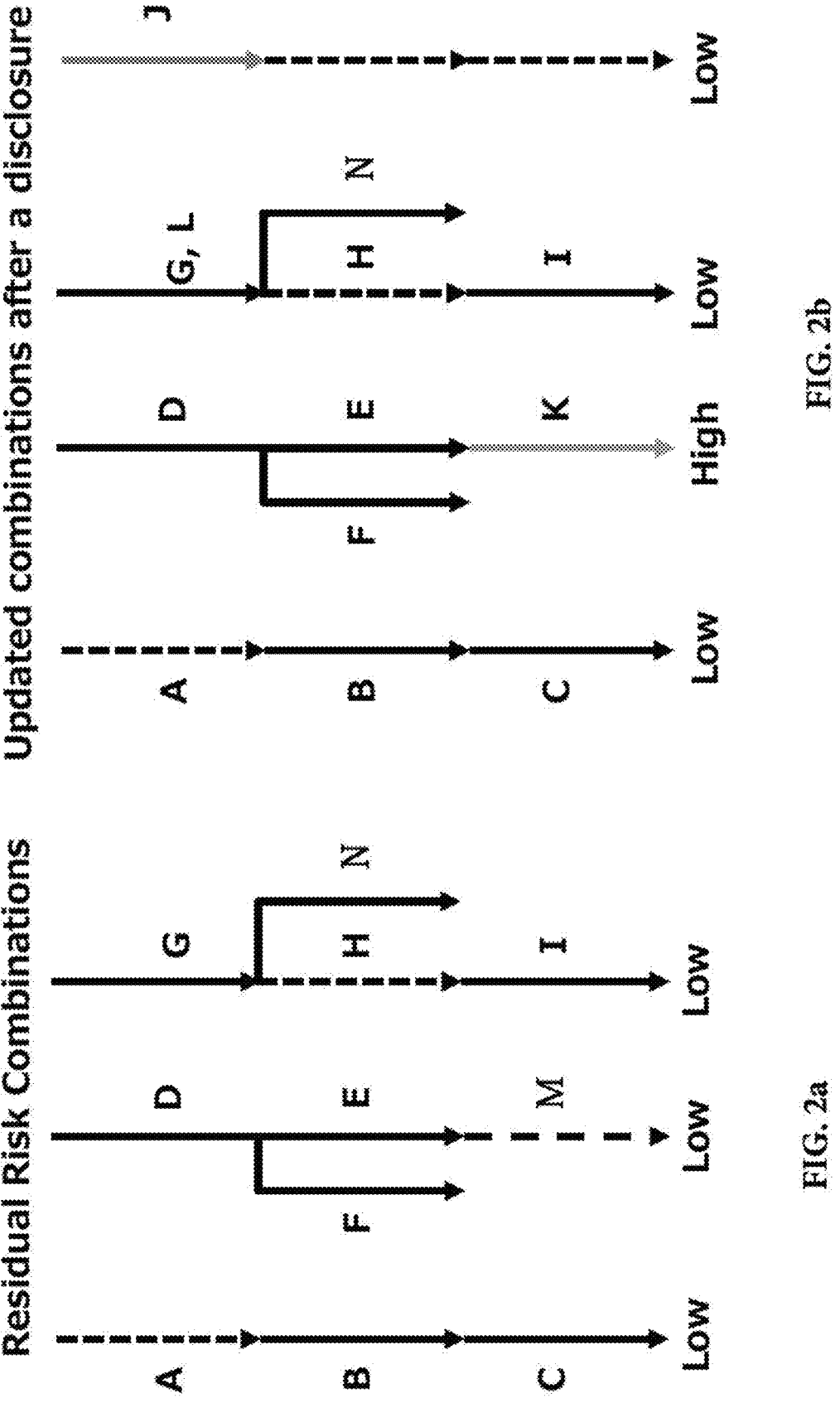
FIG. 2a depicts exploit combinations of known vulnerabilities, according to one or more embodiments described herein.
FIG. 2b depicts updated exploit combinations of known vulnerabilities and new vulnerabilities, according to one or more embodiments described herein.

At step S104 and with reference to FIGS. 1, 2a and 2b, the method may include creating a database of exploit combinations for known vulnerabilities. The known vulnerabilities may include just the low-risk vulnerabilities, or may additionally or alternatively include the medium-risk and high-risk vulnerabilities. As used herein, "known vulnerabilities" are vulnerabilities that were previously flagged or identified by a user or computer and are stored within a memory or database prior to new vulnerabilities being added to the memory or database. As shown in FIG. 2a, vulnerabilities that are related may be chained together to identify whether the vulnerabilities compound the effects on the vehicle systems, thereby increasing the risk score associated with each of the vulnerabilities. As shown in FIG. 2a, the first exploit combination chains vulnerabilities A, B, and C together, where A is shown as a dotted line. The dotted line signifies an unknown issue where a new vulnerability, or known issue, may be added to chain to the remaining vulnerabilities. The second and third exploit combinations include branches, where vulnerability F branches off of vulnerability D, where each of vulnerabilities E and F are chained to vulnerability D to create additional exploit combinations. In other words, the second exploit combination may alternatively be two separate exploit combinations of vulnerabilities D and F, and vulnerabilities D, E, and M.

Referring again to FIGS. 1, 2a, and 2b, at step S106, the method may include inputting new vulnerabilities and, at step S108, may include determining whether the new vulnerabilities fit into an existing exploit combination or create a new exploit combination. The new vulnerabilities may be added to the known vulnerabilities, such as in a list, by being manually input by a user or automatically input by a computer. The method 100 may determine that the new vulnerabilities fit into the existing exploit combination if at least one of the new vulnerabilities forms an attack chain with the known vulnerabilities, thereby allowing an attacker to exploit weaknesses in the system. If the new vulnerabilities do not fit into an existing exploit combination, the method 100 may proceed to step S109, where a new exploit combination is created. The method 100 may create a new exploit combination if at least one of the new vulnerabilities is exploitable by an attacker without being chained with other vulnerabilities. Each of the existing exploit combinations, updated exploit combinations, and new exploit combination may be saved in a database or other memory to be accessed and updated when new vulnerabilities are added to the system. If the new vulnerabilities fit into an existing exploit combination, the method may proceed to step S110, where the method 100 may include updating the exploit combinations based on the new vulnerabilities, wherein the updated exploit combinations comprise vulnerabilities that allow for an executable stack. As shown in FIG. 2b, new vulnerability K replaces known vulnerability M in FIG. 2a to form a new exploit combination of vulnerabilities D, E, and K. New vulnerability J forms a new exploit combination, thereby increasing the opportunities for new vulnerabilities to form exploit combinations with vulnerability J to have high- or medium-risk scores. New vulnerability L overlaps with known vulnerability G, where a new vulnerability may chain together with either of known vulnerability G or new vulnerability L. A single vulnerability may form an exploit combination with multiple vulnerabilities, such as vulnerability I in FIG. 2b, where vulnerability I chains together with vulnerabilities G, L, and H to form multiple exploit combinations.

At step S112, the method may include applying a risk score to the updated and new exploit combinations for determining a priority of remediation efforts, and may determine whether the risk score of the updated and new exploit combinations are greater than the exploit combinations prior to updating. The applied risk score may be compared to the first and second predetermined thresholds to determine whether the risk scores for the exploit combinations are high-risk, medium-risk, or low-risk. As shown in FIG. 2b, the updated exploit combination of vulnerabilities D, E, and K has a high-risk risk score, compared to the low-risk risk score of exploit combination of vulnerabilities D, E, and F in FIG. 2a. The method may additionally include identifying the updated exploit combinations with a risk score at or above the predetermined threshold. For example and with reference to FIGS. 2a and 2b, the method may determine that the risk score of the updated exploit combination of vulnerabilities D, E, and new vulnerability K is greater than the exploit combination of known vulnerabilities D, E, and M. The method may further identify that the updated exploit combination of vulnerabilities D, E, and K has a risk score at or above the first and second predetermined thresholds, such that the updated exploit combination has a high-risk risk score.

At step S116, the method may include determining and performing one or more automated actions to be taken based on the updated exploit combinations and determined risk scores. The automated actions may include sending a message to at least one of: a personal device, a third-party service provider, or a security operation center. The message may be presented on a display, and may include information identifying the new vulnerability and updated exploit combination(s) that have an increased risk score and/or a risk score at or above one of the predetermined thresholds. The message may additionally include the risk score and relevant risk score increase relating to the new vulnerability and updated exploit combination. Further automated actions are contemplated and possible, such as implementing an artificial intelligence (AI) program for further assessing the new vulnerabilities and updated exploit combinations, which may fix the bugs associated with the new vulnerabilities and updated exploit combinations. For example, a large language model (LLM) prompted to mitigate the high-risk risk score exploit combination may generate and embed program instrumentation (e.g., hooks) that detects the presence of an exploit condition associated with the exploit combination and consequently aborts the program. Alternatively, the system may perform additional actions such as the reconfiguration of firewall rules, the alteration or addition of program logic to eliminate one or more vulnerabilities included in the exploit combination, increasing the execution behavior and so forth. For further example, the automated actions may include disabling vehicle functions or placing the vehicle in a safe mode that disables autonomous functions of the vehicle. The method 100 may further include, at step S118, updating the new risk scores and exploit combinations in the database.

For example and with reference to vulnerabilities D, E, and M in FIGS. 2a and 2b, vulnerability D may be a command injection with a local privilege, and vulnerability F may be a lack of authorization request from an internal server, each carrying medium risk. Vulnerability E may be a file access set to world readable and disclosing a location and command for an internal authorization request, carrying low risk. While Vulnerability E has low risk, the addition of vulnerability E may form a chain from vulnerability D to vulnerability M, allowing an attacker to go from local command injection to a full web shell with privilege. In response, the method 100 would automatically update the risk associated with vulnerability E by recognizing the increased risk of chaining vulnerabilities D and F together.

For further example and with reference to vulnerabilities A, B, C, and D in FIGS. 2a and 2b, vulnerability B may allow for privilege escalation with low risk, vulnerability C may be an over-the-air update with a race condition occurring during an update with low risk, and vulnerability D may be a file configuration that allows an attacker message to flow through the network with low risk. Vulnerability A may be a remote web shell with a local privilege carrying medium risk that, when added to vulnerabilities B-D, an attacker may be able to chain each of vulnerabilities A-D to update the file configuration that should only be updated through over-the-air updates. In this chain, an attacker may leverage the low-risk vulnerabilities B-D to perform a high-risk attack. In this example, the method 100 would identify the risk associated with vulnerability A being added to the chain.

Figure 3:
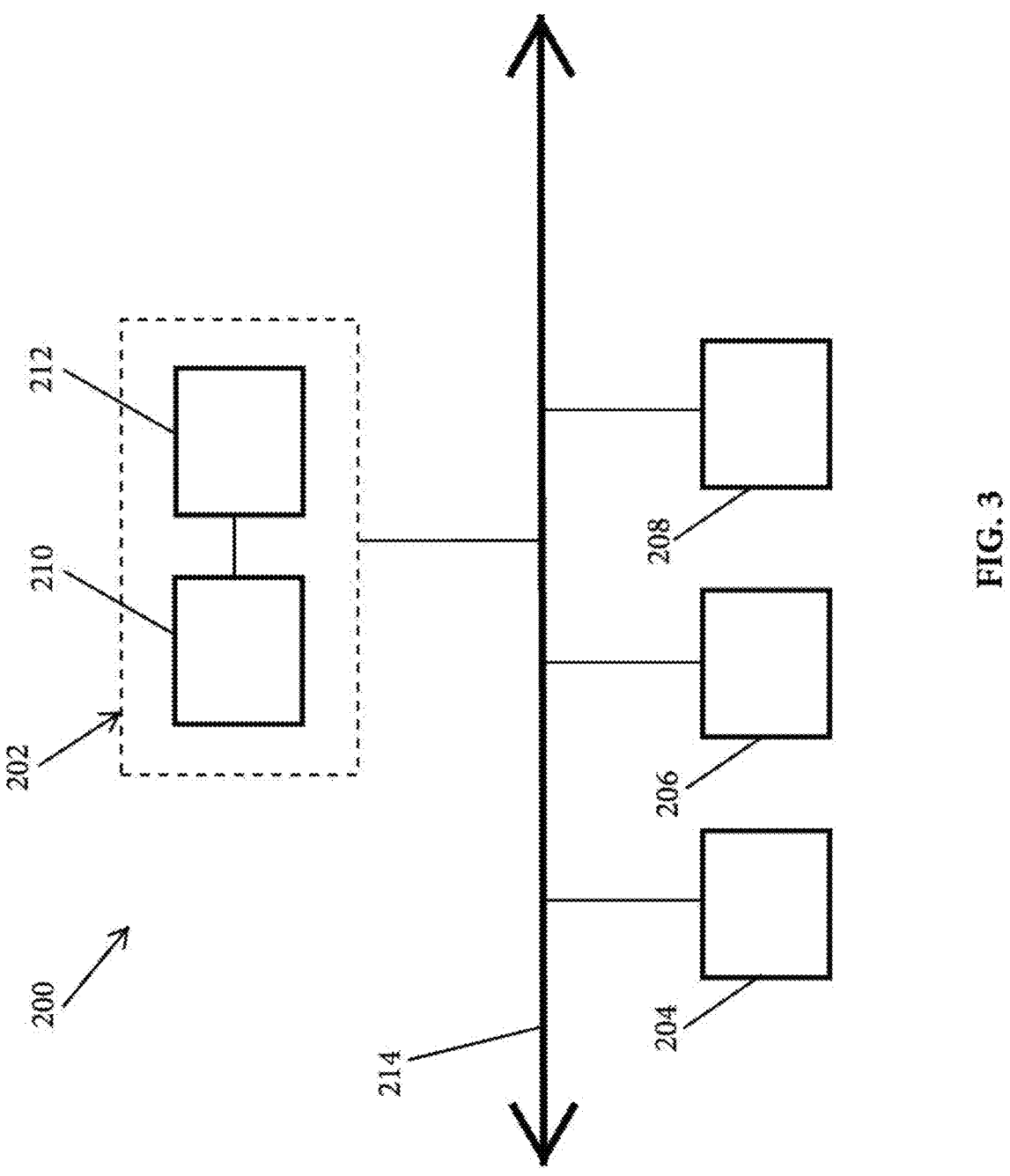
FIG. 3 schematically depicts a system for identifying and assessing new vulnerabilities in a software system, according to one or more embodiments described herein.

Referring now to FIG. 3, a system 200 for determining vulnerability criticality is depicted. The system 200 may include various structures, as will be described below, to be configured to perform the steps S102-S116 of method 100 recited above. As shown in FIG. 3, the system 200 may include a controller 202 communicatively coupled with a database 204, a display 206, and an input device 208 along a communication path 214. The input device 208 may be configured for inputting and sending information to the controller 202 and the database 204. As such, the controller 202 may include an input/output (I/O) interface configured to provide digital and/or analog inputs and outputs. The I/O interface can be used to transfer information between internal storage and external input and/or output devices (e.g., display). The I/O interface can include associated circuitry or BUS networks to transfer such information. Such a BUS or associated circuitry can allow the components to be communicatively coupled. As used herein, the term "communicatively coupled" means that coupled components are capable of exchanging data signals with one another such as, for example, electrical signals via conductive medium, electromagnetic signals via air, optical signals via optical waveguides, and the like.

The controller 202 includes one or more computing system processors 210 and one or more non-transitory electronic memories 212 to which various components are communicatively coupled. In some embodiments, the one or more processors 210 and the non-transitory electronic memory 212 and/or the other components are included within a single device. In other embodiments, the one or more processors 210 and the non-transitory electronic memory 212 and/or the other components may be distributed among multiple devices that are communicatively coupled. The controller 202 includes non-transitory electronic memory 212 that stores a set of machine-readable instructions. The one or more processors 210 executes the machine-readable instructions stored in the non-transitory electronic memory 212. The machine-readable instructions may include software that controls operation of the one or more processors 210 to perform the operations described herein to be performed by the controller 202. The non-transitory electronic memory 212 may include volatile memory and non-volatile memory for storing instructions and data. The non-volatile memory may include solid-state memories, such as NAND flash memory, magnetic and optical storage media, or any other suitable data storage device that retains data when the processor is deactivated or loses electrical power. In some embodiments, the memory 212 may include the database 204. Non-volatile storage may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The volatile memory may include static and/or dynamic random-access memory (RAM), flash memory, cache memory, or other memory capable of storing program instructions and data. In short, the non-transitory electronic memory 212 may include RAM, ROM, flash memories, hard drives, or any device capable of storing machine-readable instructions such that the machine-readable instructions can be accessed by the one or more processors 210 to output a control signal for the controller 202 to act on. The non-transitory electronic memory 212 may be implemented as one memory module or a plurality of memory modules.

The one or more processors 210 may be any device capable of executing machine-readable instructions. For example, the one or more processors 210 may be or include an integrated circuit, a microchip, a computer, a microprocessor, a micro-controller, a digital signal processor, a microcomputer, a central processing unit, field programmable gate arrays, programmable logic devices, state machines, logic circuits, analog circuits, digital circuits, or any other devices that manipulate signals (analog or digital) based on computer-executable instructions residing in memory. The non-transitory electronic memory 212 and the one or more processors 210 are coupled to the communication path 214 that provides signal interconnectivity between various components and/or modules of the system 200. Accordingly, the communication path 214 may communicatively couple any number of processors with one another, and allow the modules coupled to the communication path 214 to operate in a distributed computing environment. Each of the controller 202, the database 204, the display 206, and the input device 208 may be connected to the communication path 214, or separately connected thereto, such as by a universal serial bus (USB), wireless communication (e.g., WiFi, 3G, 4G, 5G, Bluetooth, etc.) or the like. The controller 202 may be communicatively coupled to an external device, such as, for example, the display 206, a server, an internet of things, or the like, to send/receive signals conveying information related to the method 100, such as the message sent from the automated response. The display 206 may be any traditional display for displaying visual information to a user, such as, for example, a screen (e.g., LED, LCD, QLED, etc.). However, it is contemplated and possible that the display 206 may be include non-visual displays of information such as a speaker, a tactile feedback device, or the like.

The system 200 is configured to perform the steps S102-S116 of the method 100 described above. The one or more processors may execute a computer readable code from a computer program product including a non-transitory computer useable medium, or may execute instructions stored by the one or more memories 212 to perform the steps of the method 100. Specifically, the processors 210 of the system 200 may execute the instructions or computer readable code to: create exploit combinations for known vulnerabilities; input new vulnerabilities; determine whether the new vulnerabilities fit into an existing exploit combination or create a new exploit combination; update the exploit combinations based on the new vulnerabilities, wherein the updated exploit combinations comprise vulnerabilities that allow for an executable stack; identify vulnerabilities within a software system, the vulnerabilities comprising high-risk vulnerabilities that have a risk score at or above a predetermined threshold, and low-risk vulnerabilities that have a risk score below the predetermined threshold, wherein the known vulnerabilities comprise the low-risk vulnerabilities; apply a risk score to the updated exploit combinations for determining a priority of remediation efforts; determine whether the risk score of the updated exploit combinations is greater than the exploit combinations prior to updating; identify the updated exploit combinations with a risk score at or above the predetermined threshold; and determine automated actions to be taken, wherein the automated actions include at least one of: sending a message to a vehicle display, a personal device, a third-party service provider, or a security operation center; disable the vehicle, and wherein the automated actions are determined based on a risk score applied to the updated exploit combinations for determining a priority of remediation efforts. The automated actions may include prompting LLM to mitigate the high-risk risk score exploit combination, as described above. In some embodiments, the automated actions may include reconfiguration of firewall rules, the alteration or addition of program logic to eliminate one or more vulnerabilities included in the exploit combination, increasing the execution behavior, and disabling vehicle functions or placing the vehicle in a safe mode that disables autonomous functions of the vehicle.

The known vulnerabilities may be stored within the memories 212 or database 204, or may be input into the memories 212 or database 204 by the input device 206. The processors 210 may create the exploit combinations from the known vulnerabilities, where the memories 212 or database 204 send the known vulnerabilities to the processors 210 for creating the exploit combinations. New vulnerabilities may be provided to one or more of the memories 212, database 204, or processors 210 by the input device 206. The input device 206 may be a user-operated device (e.g., a keyboard), or may be a computer that automatically sends inputs to the system 200. In embodiments where the input device 206 is a computer, the new vulnerabilities may be automatically determined based on information from an internet-of-things.

Once the processors 210 determine the risk scores of the updated exploit combinations, whether the risk scores of the updated exploit combinations are greater than the exploit combinations prior to updating, and whether the updated exploit combinations with a risk score at or above the predetermined threshold, the processors 210 may store the information in at least one of the memories 212 or database 204. The processors 210 may perform the automated actions determined to be taken. When the determined actions include sending a message to a vehicle display, a personal device, a third-party service provider, or a security operation center, the processors 210 may create the message including information identifying the new vulnerabilities and updated exploit combinations that have an increased risk score, a risk score above at least one or the predetermined thresholds, or both. The processors 210 may then send the message to the database 204, the display 206, or any other device communicatively coupled to the controller 202.

The above method and system may be implemented in various systems for determining risks associated with new and existing vulnerabilities during software development and implementation. In one example, the method and system may be implemented in a vehicle ECU or in a system in parallel with a vehicle ECU, where software is to be uploaded to a vehicle ECU after development in the parallel system. The method and system may additionally be implemented in a plurality of systems that are communicatively coupled to one another, where inputs may be communicated between the systems without user interaction.

The present disclosure is further defined by the following clauses:

Clause 1. A method including: creating exploit combinations for known vulnerabilities; inputting new vulnerabilities; determining whether the new vulnerabilities fit into an existing exploit combination or create a new exploit combination; and updating the exploit combinations based on the new vulnerabilities.

Clause 2. The method of clause 1, wherein the updated exploit combinations include vulnerabilities that allow for an executable stack.

Clause 3. The method of either of the preceding clauses, further including identifying vulnerabilities within a software system, the vulnerabilities comprising high-risk vulnerabilities that have a risk score at or above a predetermined threshold, and low-risk vulnerabilities that have a risk score below the predetermined threshold, wherein the known vulnerabilities comprise the low-risk vulnerabilities.

Clause 4. The method of any of the preceding clauses, further including applying a risk score to the updated exploit combinations for determining a priority of remediation efforts.

Clause 5. The method of clause 4, further including determining whether the risk score of the updated exploit combinations is greater than the exploit combinations prior to updating.

Clause 6. The method of either of clauses 4 and 5, further including identifying the updated exploit combinations with a risk score at or above the predetermined threshold.

Clause 7. The method of any of the preceding clauses, further including determine automated actions to be taken, wherein the automated actions include at least one of: sending a message to a vehicle display, a personal device, a third-party service provider, or a security operation center; disable the vehicle.

Clause 8. The method of clause 7, wherein the automated actions are determined based on a risk score applied to the updated exploit combinations for determining a priority of remediation efforts.

Clause 9. A computer program product including a non-transitory computer useable medium including a computer readable code, wherein the computer readable code when executed using one or more computing device processors, causes the one or more computing processors to: create exploit combinations for known vulnerabilities; input new vulnerabilities; determine whether the new vulnerabilities fit into an existing exploit combination or create a new exploit combination; and update the exploit combinations based on the new vulnerabilities.

Clause 10. The computer program product of clause 9, wherein the updated exploit combinations include vulnerabilities that allow for an executable stack.

Clause 11. The computer program product of clauses 9 or 10, wherein the computer readable code when executed using one or more computing device processors, causes the one or more computing processors to: identify vulnerabilities within a software system, the vulnerabilities including high-risk vulnerabilities that have a risk score at or above a predetermined threshold, and low-risk vulnerabilities that have a risk score below the predetermined threshold, wherein the known vulnerabilities include the low-risk vulnerabilities.

Clause 12. The computer program product of any of the preceding clauses, wherein the computer readable code when executed using one or more computing device processors, causes the one or more computing processors to: apply a risk score to the updated exploit combinations for determining a priority of remediation efforts.

Clause 13. The computer program product of any of the preceding clauses, wherein the computer readable code when executed using one or more computing device processors, causes the one or more computing processors to: determine automated actions to be taken, wherein the automated actions include at least one of sending a message to a vehicle display, a personal device, a third-party service provider, or a security operation center; disable the vehicle.

Clause 14. The computer program product of any of the preceding clauses, wherein the automated actions are determined based on a risk score applied to the updated exploit combinations for determining a priority of remediation efforts.

Clause 15. A system including: one or more computing system processors; and memory storing instructions that, when executed by the one or more computing system processors, causes the system to: create exploit combinations for known vulnerabilities; input new vulnerabilities; determine whether the new vulnerabilities fit into an existing exploit combination or create a new exploit combination; and update the exploit combinations based on the new vulnerabilities.

Clause 16. The system of clause 15, wherein the updated exploit combinations include vulnerabilities that allow for an executable stack.

Clause 17. The system of clauses 15 or 16, wherein the instructions when executed using one or more computing device processors, causes the one or more computing processors to: identify vulnerabilities within a software system, the vulnerabilities including high-risk vulnerabilities that have a risk score at or above a predetermined threshold, and low-risk vulnerabilities that have a risk score below the predetermined threshold, wherein the known vulnerabilities include the low-risk vulnerabilities.

Clause 18. The system of any of the preceding clauses, wherein the instructions when executed using one or more computing device processors, causes the one or more computing processors to: apply a risk score to the updated exploit combinations for determining a priority of remediation efforts.

Clause 19. The system of any of the preceding clauses, wherein the instructions when executed using one or more computing device processors, causes the one or more computing processors to: determine automated actions to be taken, wherein the automated actions include at least one of: sending a message to a vehicle display, a personal device, a third-party service provider, or a security operation center; disable the vehicle.

Clause 20. The system of clause 19, wherein the automated actions are determined based on a risk score applied to the updated exploit combinations for determining a priority of remediation efforts.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method comprising:
creating exploit combinations for known vulnerabilities within a software system;
inputting new vulnerabilities into the software system;
determining whether the new vulnerabilities fit into an existing exploit combination or create a new exploit combination;
updating the exploit combinations based on the new vulnerabilities;
applying a risk score to the updated exploit combinations for determining a priority of remediation efforts; and
determining whether the risk score of the updated exploit combinations is greater than the exploit combinations prior to updating.

2. The method of claim 1, wherein the updated exploit combinations comprise vulnerabilities that allow for an executable stack.

3. The method of claim 1, further comprising identifying vulnerabilities within the software system, the vulnerabilities comprising high-risk vulnerabilities that have a risk score at or above a predetermined threshold, and low-risk vulnerabilities that have a risk score below the predetermined threshold, wherein the known vulnerabilities comprise the low-risk vulnerabilities.

4. The method of claim 1, further comprising identifying the updated exploit combinations with a risk score at or above the predetermined threshold.

5. The method of claim 1, further comprising determine automated actions to be taken, wherein the automated actions include at least one of: sending a message to a vehicle display, a personal device, a third-party service provider, or a security operation center; disable the vehicle.

6. The method of claim 5, wherein the automated actions are determined based on a risk score applied to the updated exploit combinations for determining a priority of remediation efforts.

7. A computer program product comprising a non-transitory computer useable medium including a computer readable code, wherein the computer readable code when executed using one or more computing device processors, causes the one or more computing processors to:

create exploit combinations for known vulnerabilities within a software system;

input new vulnerabilities into the software system;

determine whether the new vulnerabilities fit into an existing exploit combination or create a new exploit combination; and update the exploit combinations based on the new vulnerabilities;

apply a risk score to the updated exploit combinations for determining a priority of remediation efforts, and determine whether the risk score of the updated exploit combinations is greater than the exploit combinations prior to updating.

8. The computer program product of claim 7, wherein the updated exploit combinations comprise vulnerabilities that allow for an executable stack.

9. The computer program product of claim 7, wherein the computer readable code when executed using one or more computing device processors, causes the one or more computing processors to: identify vulnerabilities within the software system, the vulnerabilities comprising high-risk vulnerabilities that have a risk score at or above a predetermined threshold, and low-risk vulnerabilities that have a risk score below the predetermined threshold, wherein the known vulnerabilities comprise the low-risk vulnerabilities.

10. The computer program product of claim 7, wherein the computer readable code when executed using one or more computing device processors, causes the one or more computing processors to: determine automated actions to be taken, wherein the automated actions include at least one of:

sending a message to a vehicle display, a personal device, a third-party service provider, or a security operation center; disable the vehicle.

11. The computer program product of claim 10, wherein the automated actions are determined based on a risk score applied to the updated exploit combinations for determining a priority of remediation efforts.

12. A system comprising:

one or more computing system processors; and memory storing instructions that, when executed by the one or more computing system processors, causes the system to:

create exploit combinations for known vulnerabilities within a software system;

input new vulnerabilities into the software system;

determine whether the new vulnerabilities fit into an existing exploit combination or create a new exploit combination;

update the exploit combinations based on the new vulnerabilities;

apply a risk score to the updated exploit combinations for determining a priority of remediation efforts; and determine whether the risk score of the updated exploit combinations is greater than the exploit combinations prior to updating.

13. The system of claim 12, wherein the updated exploit combinations comprise vulnerabilities that allow for an executable stack.

14. The system of claim 12, wherein the instructions when executed using one or more computing device processors, causes the one or more computing processors to: identify vulnerabilities within the software system, the vulnerabilities comprising high-risk vulnerabilities that have a risk score at or above a predetermined threshold, and low-risk vulnerabilities that have a risk score below the predetermined threshold, wherein the known vulnerabilities comprise the low-risk vulnerabilities.

15. The system of claim 12, wherein the instructions when executed using one or more computing device processors, causes the one or more computing processors to: determine automated actions to be taken, wherein the automated actions include at least one of: sending a message to a vehicle display, a personal device, a third-party service provider, or a security operation center; disable the vehicle.

16. The system of claim 15, wherein the automated actions are determined based on a risk score applied to the updated exploit combinations for determining a priority of remediation efforts.

\*　\*　\*　\*　\*